United States Patent [19]
Basaraba

[11] 3,774,957
[45] Nov. 27, 1973

[54] COMPACT CAMPER
[75] Inventor: Peter Basaraba, Watson, Sask., Canada
[73] Assignee: The Raymond Lee Organization Inc., New York, N.Y.; part interest.
[22] Filed: Apr. 19, 1972
[21] Appl. No.: 245,509

[52] U.S. Cl................ 296/23 MC, 296/26
[51] Int. Cl................................. B60p 3/34
[58] Field of Search.............. 296/23 MC, 23 R, 296/23 H, 26

[56] References Cited
UNITED STATES PATENTS
| | | | |
|---|---|---|---|
| 3,259,422 | 7/1966 | Canon | 296/23 MC |
| 3,608,953 | 9/1971 | Bernard | 296/23 H |
| 3,381,421 | 5/1968 | Sicklesteel | 296/26 |

Primary Examiner—Philip Goodman
Attorney—Howard I. Podell

[57] ABSTRACT

A portable camper unit mounted atop of a station wagon type of automobile which opens upwards and sidewards to provide sheltered quarters and storage space above the roof of the automobile, and is extendable rearwards of the automobile so that attached curtains provide dressing room for the campers, with the opened tail gate of the station wagon providing the floor for said dressing area. In the folded condition, the camper unit provides storage space for the camping equipment.

3 Claims, 3 Drawing Figures

PATENTED NOV 27 1973 3,774,957

COMPACT CAMPER

SUMMARY OF THE DISCLOSURE

The object of this invention is to furnish sportsmen and tourists with a compact camper unit which mounts on top of the roof of a station wagon, and thus eliminates the necessity of towing of trailers, or the use of specialized automotive equipment for camping outdoors.

In my invention, the camper unit is mounted on the roof of a station wagon, preferably by the use of conventional roof carriers. In the camping mode, the unit is extendable to approximately double its folded height, by means of hinged struts, permitting adequate space for camping quarters in the station wagon and the extended space. The device includes two storage cubicles which extend sideways in the opened condition. When the unit is unfolded, the upper section pivots upwards and to the rear to provide a roofed area over the opened tail gate of the station wagon. This latter area is enclosed by curtains hung from the extended roof section so as to provide enclosed dressing quarters.

BRIEF DESCRIPTION OF THE DRAWINGS

The objects and features of my invention may be understood with reference to the following detailed description of an illustrative embodiment of the invention taken together with the accompanying drawing in which.

DESCRIPTION OF THE PREFERRED EMBODIMENT

Figure 1:
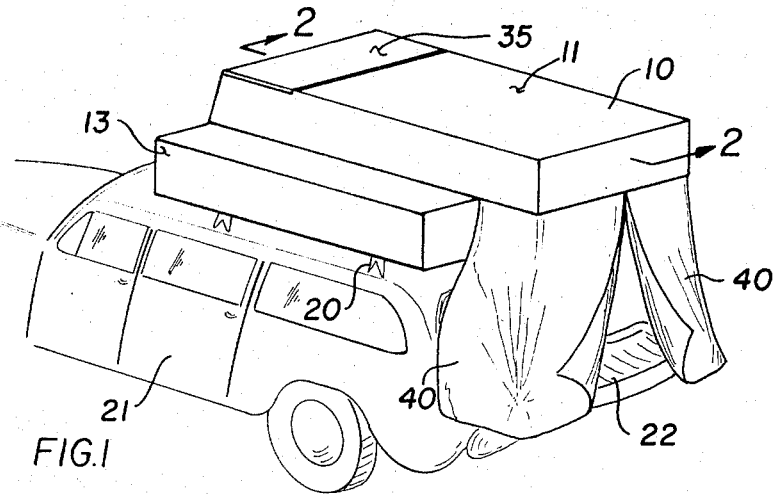
FIG. 1 is a perspective view of the camper unit in the camper mode.

Turning now descriptively to the drawings, in which similar reference characters denote similar elements throughout the several views, FIG. 1 illustrates the camper unit 10 extended in the camper mode, mounted on carriers 20 fastened to the roof of the station wagon 21.

The cover unit 11 of the camper assembly has been rotated upwards and to the rear by pivoted struts 17 and 18 mounted to the base 16 by hinges 31 and 32 respectively. Storage compartments 12 and 13 are moved outwards to provide the expanded side structure and to support the cover unit 11 in the expanded condition.

The storage units 12 and 13 are fitted with shelves 36 which may contain air mattresses and other camping equipment.

Curtains 40 preferably of canvas hang from the rear of the cover unit 11 over tailgate 22 of the station wagon 21.

Ventilation is provided by folding louvre 35 located in the forward section of the cover unit 11.

Figure 2:
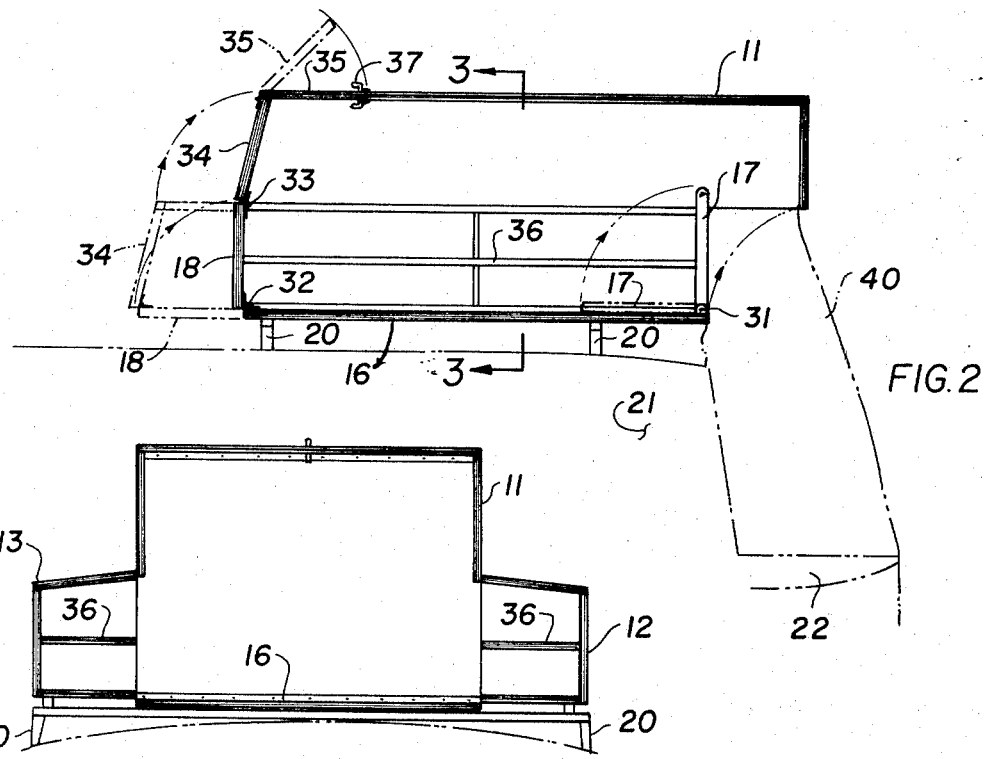
FIG. 2 is a fragmentary side view of the camper unit.
Figure 3:
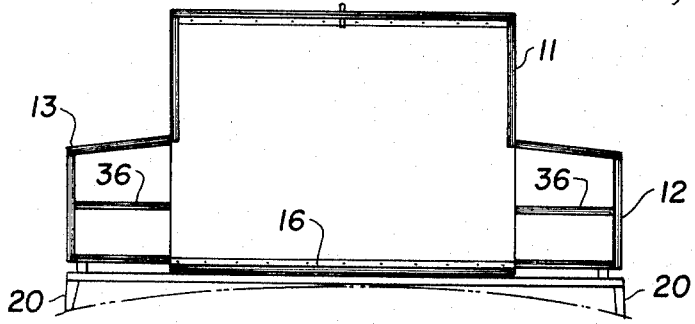
FIG. 3 is a cross-section of lines 3—3 of FIG. 2.

In the closed position, the storage units 12 and 13 are moved together under the cover unit 11 and the cover unit then folds to enclose said storage units, pivoting forward in the process as shown in the dotted lines in FIG. 2 so as to be present a compact profile and to eliminate the rear overhang.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new and desire to secure by Letters Patent of the United States is:

1. A portable camper unit adaptable for mounting on the roof of a station wagon model automobile, said camper unit when installed having an external cover unit with means to pivot said cover unit upwards and to the rear of the base of the assembly in the expanded mode, so as to project over the rear of the station wagon, together with storage compartments on each side of the camper unit which in the expanded mode may be moved apart from each other to become the support for the upraised cover, and provide additional space under the cover unit for camping needs, with provisions for screens hanging from the rear projection of the cover unit, when in the expanded mode, to provide an enclosed space for dressing quarters in which said unit comprises a cover unit mounted over a base assembly, with the cover unit formed of a flat roof section supported by two lateral side panels each joined to a forward end side panel and a rear end side panel, with the lateral side panels of the cover section pivotably mounted to strut members that are pivotably fastened to the base of the base section, so that the strut members may be rotated to raise the cover section from a closed position in which the cover section encloses the base section, to a raised position above the base section, said struts being mounted so that in the elevated position of the cover section, the rear of the cover section extends past the rear of the base assembly, with the base assembly formed of a flat base section upon which is fitted storage compartments that are slidably mounted on the base section so that, in the elevated position of the cover unit, the storage compartments may be slid laterally away from the center of the base section and under the lateral sides of the cover unit, to support the cover unit in the elevated position.

2. A portable camper unit as described in claim 1, in which a part of the roof section of the external cover unit is hinged so as to provide ventilation, when said section is rotated into the open position, said roof section being formed of two panels, a forward roof panel which is hinged to the forward end side panel, so as to permit pivoting of said forward roof panel upwards to provide a vent opening in the cover section, with a rear roof panel which is fixed to the two lateral side panels and to the rear end side panel.

3. A portable camper unit as described in claim 1 in which the cover unit projects over the opened tailgate of the station wagon in the expanded mode, with the space bounded by the tailgate and the rear projection of the cover unit being enclosed by curtains so as to expand the volume of enclosed space of the station wagon to provide enlarged quarters for camping purposes.

* * * * *